United States Patent
Momo et al.

(10) Patent No.: US 9,275,798 B2
(45) Date of Patent: Mar. 1, 2016

(54) METHOD FOR MANUFACTURING A DOUBLE LAYER CAPACITOR AND A LITHIUM ION CAPACITOR

(71) Applicant: SEMICONDUCTOR ENERGY LABORATORY CO., LTD., Atsugi-shi, Kanagawa-ken (JP)

(72) Inventors: Junpei Momo, Kanagawa (JP); Yumiko Saito, Kanagawa (JP); Rie Matsubara, Kanagawa (JP); Hiroatsu Todoriki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 4 days.

(21) Appl. No.: 14/263,000

(22) Filed: Apr. 28, 2014

(65) Prior Publication Data

US 2014/0230208 A1      Aug. 21, 2014

Related U.S. Application Data

(62) Division of application No. 13/167,017, filed on Jun. 23, 2011, now Pat. No. 8,749,953.

(30) Foreign Application Priority Data

Jun. 30, 2010   (JP) ................. 2010-149499

(51) Int. Cl.
*H01G 9/00*    (2006.01)
*H01G 11/06*   (2013.01)
(Continued)

(52) U.S. Cl.
CPC ............. *H01G 9/0029* (2013.01); *H01G 11/06* (2013.01); *H01G 11/24* (2013.01); *H01G 11/30* (2013.01); *H01G 11/50* (2013.01); *H01G 11/86* (2013.01); *H01G 2009/0007* (2013.01);
(Continued)

(58) Field of Classification Search
CPC ....... H01G 11/34; H01G 11/32; H01G 11/38; H01G 11/48; H01G 11/42; H01G 11/46; H01G 11/52; H01G 11/54; H01G 11/56; H01G 11/58; H01G 11/82; H01G 9/035
See application file for complete search history.

(56) References Cited

U.S. PATENT DOCUMENTS 5,953,204 A    9/1999  Suhara et al.
6,461,769 B1   10/2002 Ando et al.
(Continued)

FOREIGN PATENT DOCUMENTS

EP    1696446 A    8/2006
JP    02-502320    7/1990
(Continued)

*Primary Examiner* — Dion R Ferguson
(74) *Attorney, Agent, or Firm* — Nixon Peabody LLP; Jeffrey L. Costellia

(57) ABSTRACT

A thin energy storage device having high capacity is obtained. An energy storage device having high output is obtained. A current collector and an active material layer are formed in the same manufacturing step. The number of manufacturing steps of an energy storage device is reduced. The manufacturing cost of an energy storage device is suppressed. One embodiment of the present invention relates to a method for manufacturing of an electric double layer capacitor, or a lithium ion capacitor, which includes porous metal electrodes formed by removing a metal from an alloy foil, and an electrolyte provided therebetween. A surface area per volume of the porous structure is greater than or equal to 100 $m^2/cm^3$.

8 Claims, 5 Drawing Sheets

(51) Int. Cl.
*H01G 11/24* (2013.01)
*H01G 11/30* (2013.01)
*H01G 11/50* (2013.01)
*H01G 11/86* (2013.01)

(52) U.S. Cl.
CPC ............ *Y02E 60/13* (2013.01); *Y02T 10/7022* (2013.01); *Y10T 29/417* (2015.01)

(56) References Cited

U.S. PATENT DOCUMENTS

| | | | |
|---|---|---|---|
| 7,443,651 | B2 | 10/2008 | Ando et al. |
| 8,004,823 | B2 | 8/2011 | Taguchi et al. |
| 8,017,270 | B2 | 9/2011 | Bartlett et al. |
| 2006/0105244 | A1 | 5/2006 | Kejha et al. |
| 2007/0002523 | A1 | 1/2007 | Ando et al. |
| 2009/0111031 | A1 | 4/2009 | Hirose et al. |
| 2009/0136834 | A1 | 5/2009 | Coowar et al. |
| 2009/0147442 | A1 | 6/2009 | Hiroi et al. |
| 2009/0253036 | A1 | 10/2009 | Owen et al. |
| 2010/0193365 | A1 | 8/2010 | Lopatin et al. |
| 2010/0238607 | A1* | 9/2010 | Park et al. ............... 361/502 |
| 2013/0321983 | A1* | 12/2013 | Chung et al. ............. 361/502 |

FOREIGN PATENT DOCUMENTS

| | | |
|---|---|---|
| JP | 03-094005 A | 4/1991 |
| JP | 2000-323362 A | 11/2000 |
| JP | 2003-077465 A | 3/2003 |
| JP | 2006-510172 | 3/2006 |
| JP | 2010-034300 A | 2/2010 |
| JP | 2010-135361 A | 6/2010 |
| WO | WO-2004/054015 | 6/2004 |
| WO | WO-2005/013299 | 2/2005 |
| WO | WO-2005/031773 | 4/2005 |

* cited by examiner

METHOD FOR MANUFACTURING A DOUBLE LAYER CAPACITOR AND A LITHIUM ION CAPACITOR

BACKGROUND OF THE INVENTION

1. Field of the Invention

One embodiment of the invention disclosed herein relates to an electric double layer capacitor and a manufacturing method thereof, and a lithium ion capacitor and a manufacturing method thereof.

2. Description of the Related Art

In recent years, technologies of energy storage devices such as secondary batteries and electrochemical capacitors have been developed.

As electrochemical capacitors, hybrid capacitors such as lithium ion capacitors (see Patent Documents 1 and 2), electric double layer capacitors (EDLC) (see Patent Documents 3 and 4), and the like have been developed.

Such an electrochemical capacitor includes a positive electrode having a positive electrode current collector and a positive electrode active material layer, a negative electrode having a negative electrode current collector and a negative electrode active material layer, and an electrolyte between the positive electrode and the negative electrode.

Surfaces of a positive electrode active material and a negative electrode active material of an electric double layer capacitor, and a surface of a positive electrode active material of a lithium ion capacitor are each provided with an electric double layer. The electric capacity is increased as the area of the electric double layer is increased, that is, as the surface area of the positive electrode active material or the negative electrode active material of the electric double layer capacitor, or the surface area of the positive electrode active material of the lithium ion capacitor is increased (see Patent Document 5).

REFERENCE

Patent Document

[Patent Document 1] Japanese Published Patent Application No. 2010-135361
[Patent Document 2] PCT International Publication No. 2005/031773
[Patent Document 3] Japanese Published Patent Application No. 2000-323362
[Patent Document 4] Japanese Published Patent Application No. 2010-34300
[Patent Document 5] Japanese Published Patent Application No. 2003-77465

SUMMARY OF THE INVENTION

In an electrochemical capacitor, the surface area of an active material layer is an important parameter for determining the capacity. This is because the capacity is increased as the surface area of the active material layer is increased.

Active carbon can be given as a material for an active material layer having a large surface area. By adjusting activation conditions in producing active carbon, active carbon having a larger surface area can be obtained.

However, when a raw material of active carbon is activated, the density of produced active carbon might be decreased. Therefore, there is a limit on the improvement in the surface area of active carbon.

In a lithium ion capacitor, high output as well as high capacity is one of important parameters. In order to obtain high output in a lithium ion capacitor, the internal resistance of an electrode needs to be low.

However, active carbon is produced using carbon with low crystallinity and thus has high resistance.

A current collector of an electric double layer capacitor and a positive electrode current collector of a lithium ion capacitor are provided to establish electrical conduction.

The thickness of the entire electrochemical capacitor can be reduced as the thickness of a current collector is smaller. However, it is impossible to make the thickness of the current collector zero.

According to a conventional technique, an active material layer is formed over a current collector in such a manner that an active material, a conductive auxiliary agent, and a binder are made to be a slurry, and the slurry including these materials is applied over the current collector and dried.

As described above, the formation process itself of the active material layer includes many steps in the conventional technique. Further, since the current collector and the active material are formed in different manufacturing steps, the total number of manufacturing steps of an energy storage device is increased.

In order to form the active material layer, it is necessary to use the conductive auxiliary agent and the binder in addition to the active material; therefore, the cost for forming the active material layer is high. Furthermore, such a large number of manufacturing steps of the energy storage device leads to high manufacturing cost.

In view of the above, an object of one embodiment of the disclosed invention is to obtain a thin energy storage device having high capacity.

Another object of one embodiment of the disclosed invention is to obtain an energy storage device having high output.

Another object of one embodiment of the disclosed invention is to form a current collector and an active material layer in the same manufacturing step.

Another object of one embodiment of the disclosed invention is to reduce the number of manufacturing steps of an energy storage device by forming a current collector and an active material layer in the same manufacturing step.

Another object of one embodiment of the disclosed invention is to suppress the manufacturing cost of an energy storage device by reducing the number of manufacturing steps of the energy storage device.

As a material for an electrode of an electric double layer capacitor and a positive electrode of a lithium ion capacitor, a porous metal material is used.

The porous metal material is produced by eluting only a certain component included in a given alloy. For example, from an alloy including a first metal material and a second metal material, only the second metal material is removed. As a result of removal of the second metal material, a pore is formed in a region of the alloy where the second metal material used to exist. In this manner, a porous metal material including the first metal material as a base can be obtained.

The porous metal material is metal and thus has conductivity. Therefore, a porous metal body formed using the porous metal material, such as a porous metal foil or a porous metal plate, functions as a current collector.

When voltage is applied to the porous metal body, an electric double layer is formed at an interface between the porous metal body and an electrolyte. In the case of a metal body having no pore, even if an electric double layer is formed, the surface area is small and thus sufficient capacity cannot be obtained. On the other hand, the porous metal body has a large surface area because a plurality of pores is included therein. When the surface area of the porous metal body is large, the area provided with the electric double layer is increased. When the area provided with the electric double layer is increased, high capacity can be obtained in an electric double layer capacitor or a lithium ion capacitor. Accordingly, a porous metal body formed using the porous metal material is suitable for a positive electrode active material layer and a negative electrode active material layer of an electric double layer capacitor, and a positive electrode active material layer of a lithium ion capacitor.

In other words, the porous metal body functions as a current collector and an active material layer of an electric double layer capacitor; the porous metal body functions as a positive electrode current collector and a positive electrode active material layer of a lithium ion capacitor.

Since the current collector and active material of the electric double layer capacitor are formed using the same material (the porous metal material), the thickness of the electrode can be reduced. Consequently, the thickness of the entire electric double layer capacitor can be reduced.

Since the positive electrode current collector and positive electrode active material layer of the lithium ion capacitor are formed using the same material (the porous metal material), the thickness of the positive electrode can be reduced. Consequently, the thickness of the entire lithium ion capacitor can be reduced.

Since the active material of the electric double layer capacitor and the positive electrode active material layer of the lithium ion capacitor are formed using a conductive material (the porous metal material), the internal resistance of the active material layer of the electric double layer capacitor and the internal resistance of the positive electrode active material layer of the lithium ion capacitor can be reduced. Consequently, an electric double layer capacitor having high output and a lithium ion capacitor having high output can be obtained.

Since the porous metal body is used as the electrode of the electric double layer capacitor and the positive electrode of the lithium ion capacitor, the current collectors and the active material layers can be formed in the same manufacturing step. Consequently, the number of manufacturing steps of the electrode of the electric double layer capacitor and the positive electrode of the lithium ion capacitor can be reduced; moreover, the number of manufacturing steps of the electric double layer capacitor and the lithium ion capacitor can be reduced.

Since the number of manufacturing steps of the electrode of the electric double layer capacitor and the positive electrode of the lithium ion capacitor, and the number of manufacturing steps of the electric double layer capacitor and the lithium ion capacitor can be reduced, the manufacturing cost can be suppressed.

One embodiment of the disclosed invention relates to an electric double layer capacitor which includes a pair of electrodes including a porous metal material, and an electrolyte provided between the pair of electrodes.

Another embodiment of the disclosed invention includes a pair of electrodes including a porous metal material, and an electrolyte provided between the pair of electrodes. The surface area per volume of the porous metal material is greater than or equal to 100 $m^2/cm^3$.

Another embodiment of the disclosed invention includes a pair of electrodes including a porous metal material, and an electrolyte provided between the pair of electrodes. The porous metal material includes at least one of copper (Cu), silver (Ag), platinum (Pt), gold (Au), chromium (Cr), iron (Fe), lead (Pb), nickel (Ni), and molybdenum (Mo).

In one embodiment of the disclosed invention, the electrode is a porous metal foil or a porous metal plate.

Another embodiment of the disclosed invention relates to a lithium ion capacitor which includes a positive electrode that is a porous metal body functioning as a positive electrode current collector and a positive electrode active material layer, a negative electrode including a negative electrode current collector and a negative electrode active material layer, and an electrolyte provided between the positive electrode and the negative electrode.

Another embodiment of the disclosed invention relates to a lithium ion capacitor which includes a positive electrode that is a porous metal body functioning as a positive electrode current collector and a positive electrode active material layer, a negative electrode including a negative electrode current collector and a negative electrode active material layer, and an electrolyte provided between the positive electrode and the negative electrode. The surface area per volume of the porous metal body is greater than or equal to 100 $m^2/cm^3$.

Another embodiment of the disclosed invention relates to a lithium ion capacitor which includes a positive electrode that is a porous metal body functioning as a positive electrode current collector and a positive electrode active material layer, a negative electrode including a negative electrode current collector and a negative electrode active material layer, and an electrolyte provided between the positive electrode and the negative electrode. The porous metal body includes at least one of copper (Cu), silver (Ag), platinum (Pt), gold (Au), chromium (Cr), iron (Fe), lead (Pb), nickel (Ni), and molybdenum (Mo).

In one embodiment of the disclosed invention, the porous metal body is a porous metal foil or a porous metal plate.

In one embodiment of the disclosed invention, the negative electrode active material layer includes any one of a carbon material, a silicon material, and a silicon alloy material.

In one embodiment of the disclosed invention, the negative electrode active material layer includes protruded crystalline silicon.

According to one embodiment of the disclosed invention, a thin energy storage device having high capacity can be obtained. According to one embodiment of the disclosed invention, an energy storage device having high output can be obtained. According to one embodiment of the disclosed invention, a current collector and an active material layer can be formed in the same manufacturing step. According to one embodiment of the disclosed invention, the number of manufacturing steps of an energy storage device can be reduced by forming a current collector and an active material layer in the same manufacturing step. According to one embodiment of the disclosed invention, the manufacturing cost of an energy storage device can be suppressed by reducing the number of manufacturing steps of the energy storage device.

DETAILED DESCRIPTION OF THE INVENTION

Figure 1B:
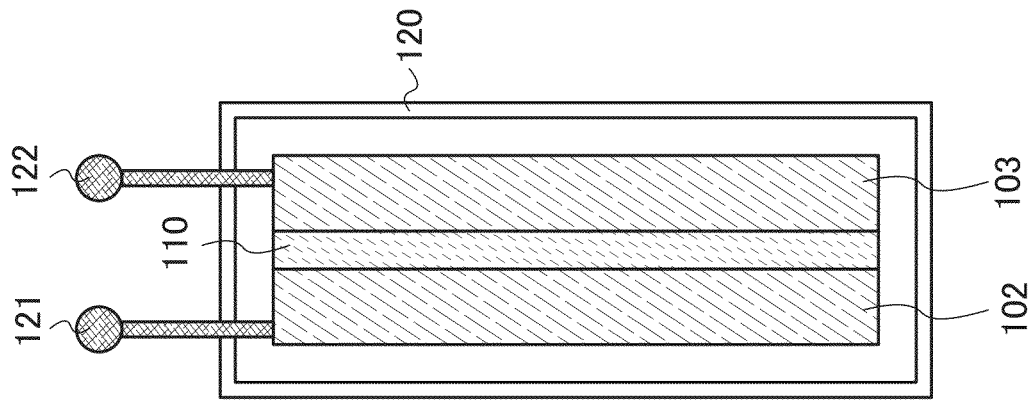
FIGS. 1A and 1B are cross-sectional views of energy storage devices.

Embodiments of the invention disclosed in this specification will be described below with reference to the drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the invention disclosed in this specification is not construed as being limited to description of the embodiments. Note that, in the drawings hereinafter shown, the same portions or portions having similar functions are denoted by the same reference numerals, and repeated description thereof will be omitted.

Embodiment 1

An energy storage device of this embodiment will be described with reference to FIGS. 1A and 1B, FIGS. 2A to 2C, and FIGS. 3A to 3C.

<Electric Double Layer Capacitor>

Figure 1A:
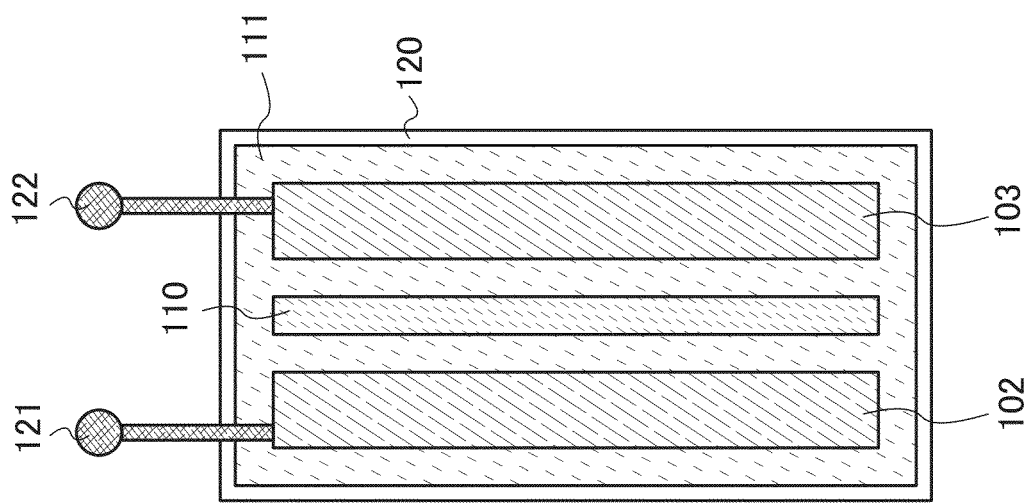

FIG. 1A is a cross-sectional view of an electric double layer capacitor of this embodiment. The electric double layer capacitor illustrated in FIG. 1A includes, inside a housing 120, a pair of electrodes 102 and 103, a separator 110 provided between the electrode 102 and the electrode 103, and an electrolyte 111 with which the housing 120 is filled. Further, the electric double layer capacitor illustrated in FIG. 1A includes a terminal portion 121 connected to the electrode 102 and a terminal portion 122 connected to the electrode 103.

FIG. 1B illustrates a cross section of an electric double layer capacitor having a structure different from that in FIG. 1A. The electric double layer capacitor illustrated in FIG. 1B includes, inside the housing 120, the pair of electrodes 102 and 103, the separator 110 provided between the electrode 102 and the electrode 103, and the electrolyte 111 included in the separator 110.

Each of the pair of electrodes 102 and 103 is a porous metal body formed using a porous metal material, such as a porous metal foil or a porous metal plate.

When the pair of electrodes 102 and 103 is formed using a porous metal material, a thin energy storage device having high capacity can be obtained. In addition, an energy storage device having high output can be obtained.

A manufacturing method of the porous metal body will be described below.

Figure 3A:
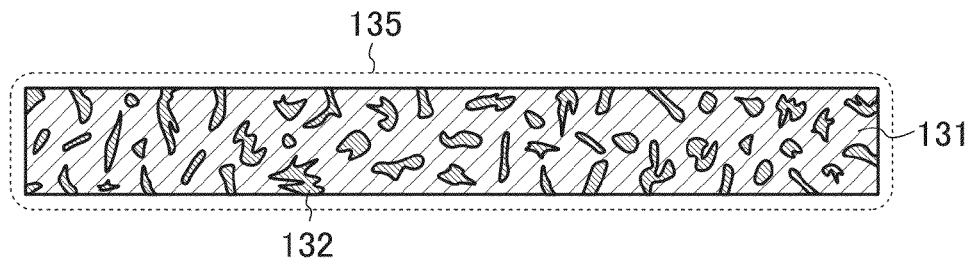
FIGS. 3A to 3C are cross-sectional views illustrating a manufacturing method of an energy storage device.

First, an alloy foil or alloy plate including at least two kinds of metal materials is prepared (see FIG. 3A). In this embodiment, an alloy foil 135 which includes a first metal material 131 serving as a base and a second metal material 132 to be removed later is prepared. Note that an alloy foil or alloy plate including two kinds of metal materials is used as the alloy foil or the alloy plate in this embodiment; however, the number of kinds of metal materials is not limited to this. Three or more kinds of metal materials may be included in the alloy foil or the alloy plate.

In the case where an acid, specifically, hydrochloric acid is used as a material for removing the second metal material 132, a metal material having a standard electrode potential higher than that of hydrogen is used as the first metal material 131. In the case where hydrochloric acid is used as the material for removing the second metal material 132, a metal material having a standard electrode potential lower than that of hydrogen is used as the second metal material 132. This is because, when an acid is used as the material for removing the second metal material 132, a metal material having a standard electrode potential lower than that of hydrogen is ionized and eluted.

Specifically, examples of the first metal material 131 serving as a base include copper (Cu), silver (Ag), platinum (Pt), and gold (Au), which are metal materials having lower ionization tendency than hydrogen. As the second metal material 132 to be removed later, magnesium (Mg), aluminum (Al), titanium (Ti), zinc (Zn), manganese (Mn), chromium (Cr), iron (Fe), cobalt (Co), nickel (Ni), molybdenum (Mo), tin (Sn), lead (Pb), and the like can be given.

Note that it is also possible to use nitric acid or sulfuric acid as the acid for removing the second metal material 132, instead of hydrochloric acid. In the case where nitric acid is used as the acid for removing the second metal material 132, chromium (Cr) or iron (Fe) can be used as the first metal material 131, besides platinum (Pt) and gold (Au). Chromium (Cr) and iron (Fe) can be passivated by nitric acid and thus can be used as the first metal material 131.

In the case where nitric acid is used as the acid for removing the second metal material 132, copper (Cu), silver (Ag), magnesium (Mg), titanium (Ti), zinc (Zn), manganese (Mn), cobalt (Co), nickel (Ni), molybdenum (Mo), or lead (Pb) may be used as the second metal material 132.

In the case where dilute sulfuric acid is used as the acid for removing the second metal material 132, lead (Pb), nickel (Ni), or molybdenum (Mo) can be used as the first metal material 131, besides copper (Cu), silver (Ag), platinum (Pt), and gold (Au). Reaction between lead (Pb) and dilute sulfuric acid generates insoluble lead sulfate on a surface of lead (Pb). Lead whose surface is provided with lead sulfate is no longer dissolved in sulfuric acid. Therefore, in the case where dilute sulfuric acid is used as the acid for removing the second metal material 132, lead (Pb) can be used as the first metal material 131. In addition, the rate of reaction between dilute sulfuric acid and nickel (Ni) is low. Therefore, in the case where dilute sulfuric acid is used as the acid for removing the second metal material 132, nickel (Ni) can be used as the first metal material 131.

In the case where dilute sulfuric acid is used as the acid for removing the second metal material 132, magnesium (Mg), aluminum (Al), titanium (Ti), zinc (Zn), manganese (Mn), chromium (Cr), iron (Fe), or cobalt (Co) may be used as the second metal material 132.

In this embodiment, for example, copper is used as the first metal material 131 and zinc is used as the second metal material 132; thus, a foil of brass, which is an alloy of copper and zinc, is used as the alloy foil 135.

Figure 3B:
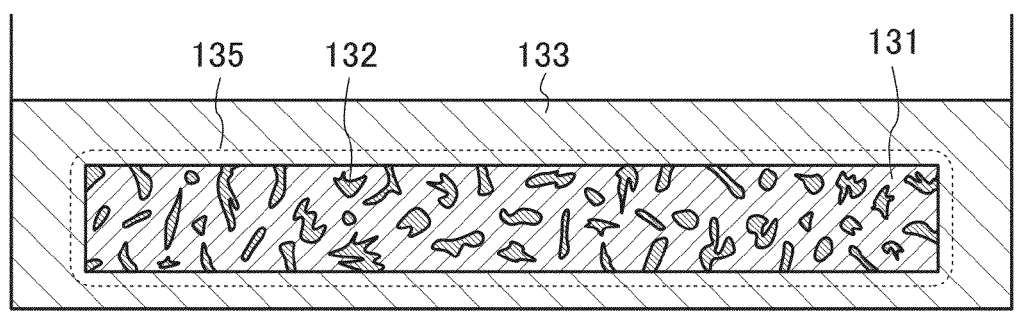

The alloy foil 135 is impregnated with a material 133 (e.g., hydrochloric acid) for removing the second metal material 132 (see FIG. 3B). As the material 133 for removing the second metal material 132, an acid such as nitric acid, hydrochloric acid, or dilute sulfuric acid may be used as described above. In this embodiment, hydrochloric acid is used as the material 133 for removing the second metal material 132.

Figure 3C:
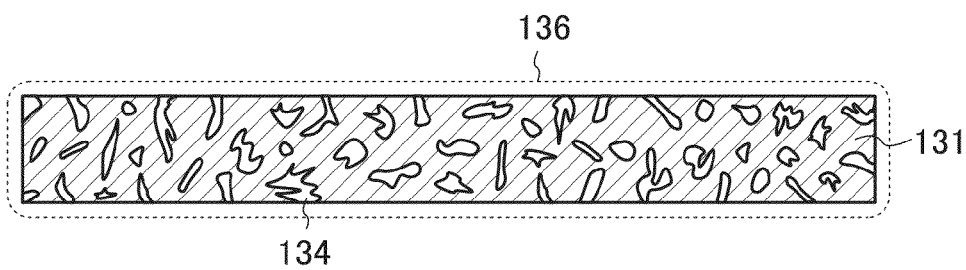

When the alloy foil 135 is impregnated with the material 133 (e.g., hydrochloric acid) for removing the second metal material 132, the second metal material 132 is eluted and a pore 134 is formed in a region where the second metal material 132 used to exist (see FIG. 3C). Accordingly, a porous metal foil 136 which includes the first metal material 131 as a base and has the pore 134 can be obtained. The obtained porous metal foil 136 may be used as the electrode 102 and the electrode 103.

In this embodiment, copper and zinc are used as the first metal material 131 and the second metal material 132, respectively, and a brass foil where the weight ratio of copper to zinc is 6:4 is prepared. The brass foil corresponds to the alloy foil 135. As the material 133 for removing the second metal material 132 (zinc), hydrochloric acid is used. The brass foil is immersed in hydrochloric acid with a concentration of $1\times10^{-3}$ mol/cm$^3$ for 500 hours or more, so that the porous metal foil 136 is formed.

Figure 5:
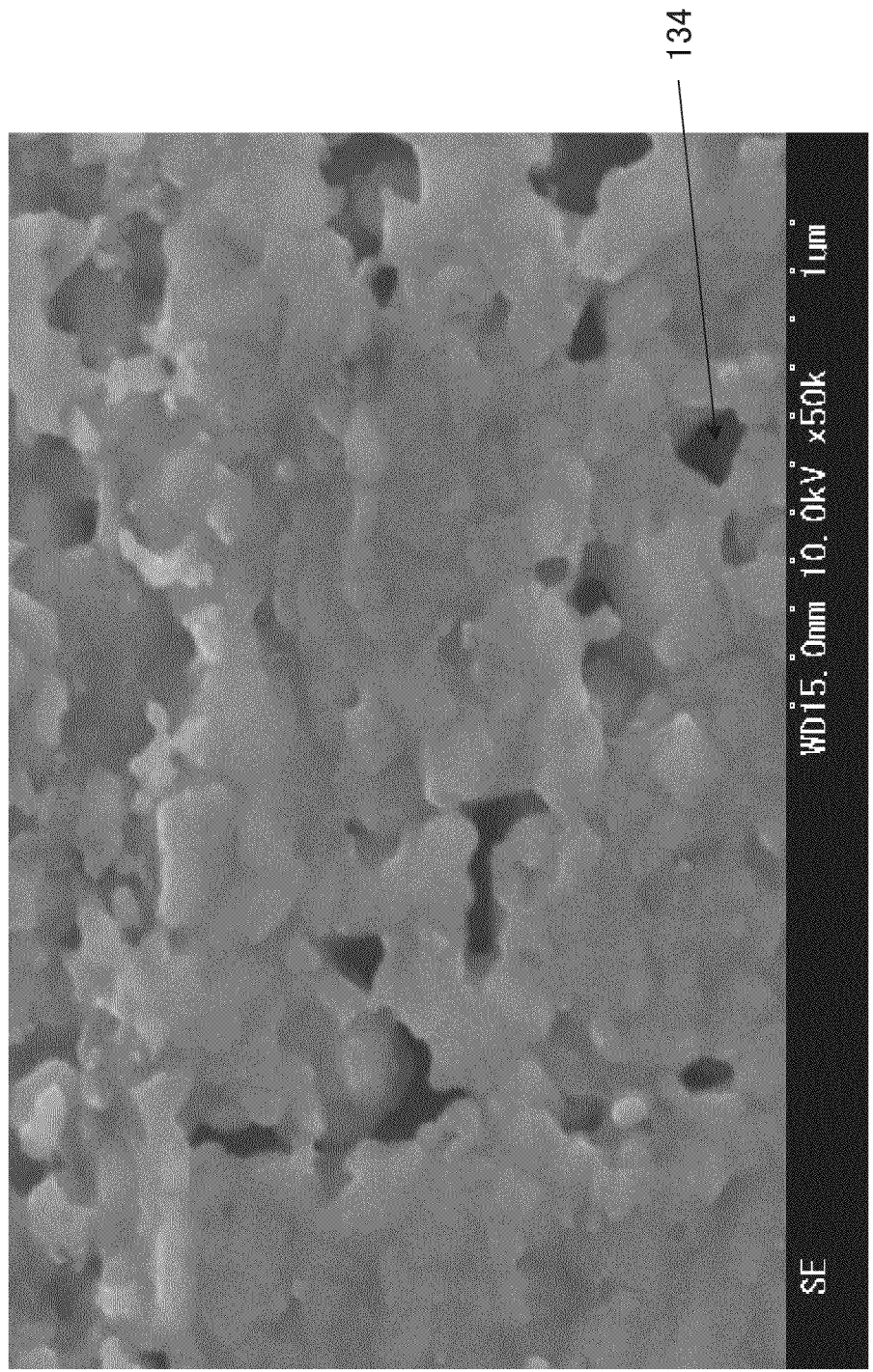
FIG. 5 is a SEM image of a porous metal foil.

FIG. 5 is a SEM image of the porous metal foil 136 manufactured in the above manner. FIG. 5 shows that zinc, which is the second metal material 132, is removed and the pore 134 is formed.

Note that the diameter of the pore 134 and the thickness of the porous metal foil 136 may be determined as appropriate on the basis of the kind of the electrolyte 111 of the electric double layer capacitor and the size of the entire electric double layer capacitor.

The surface area per volume of the porous metal foil 136 is preferably greater than or equal to 100 m$^2$/cm$^3$. When the surface area per volume of the porous metal foil 136 is greater than or equal to 100 m$^2$/cm$^3$, the contact area between the porous metal foil 136 and the electrolyte 111 is significantly large; accordingly, the electric capacity, which corresponds to the amount of electricity that can be stored, can be increased.

In this manner, the number of manufacturing steps of an energy storage device can be reduced by forming a current collector and an active material layer in the same manufacturing step. The manufacturing cost of an energy storage device can be suppressed by reducing the number of manufacturing steps of the energy storage device.

As the housing 120, a laminate film, a polymer film, a metal film, a metal case, a plastic case, or the like may be used.

As the electrolyte 111, for example, an electrolyte solution can be used. As the electrolyte solution, an electrolyte solution which includes hydroxide ions and uses water as a solvent, such as a lithium hydroxide aqueous solution, a potassium hydroxide aqueous solution, a sodium hydroxide aqueous solution, a calcium hydroxide aqueous solution, or a tetraalkylammonium hydroxide aqueous solution, can be used for example. It is preferable to use an aqueous solution in which hydroxide of an alkali metal is dissolved in water, further preferably a lithium hydroxide aqueous solution. An aqueous solution including lithium ions is particularly suitable for the electrolyte solution because lithium (Li) has the lowest standard electrode potential.

Alternatively, an acid which includes hydrogen ions and uses water as a solvent can be used as the electrolyte solution. As an example of such an acid, dilute sulfuric acid can be given.

Further alternatively, an electrolyte solution in which a solute of a salt where an alkali metal cation such as a lithium ion or a potassium ion and an anion such as $BF_4^-$, $PF_6^-$, $ClO_4^-$, or $CF_3SO_3^-$ are combined is dissolved in an organic solvent may be used, for example.

Still further alternatively, an electrolyte solution in which a solute of tetraalkylammonium salt is dissolved in an organic solvent may be used. When tetraalkylammonium salt is dissolved in an organic solvent, a tetraalkylammonium cation and an anion as a counterpart are generated. These tetraalkylammonium cation and anion form electric double layers. Examples of the tetraalkylammonium cation include a tetraethylammonium cation and a tetrabutylammonium cation. As an example of the anion as the counterpart, $PF_6^-$ can be given.

As the organic solvent, for example, an organic solvent including at least one kind of materials selected from propylene carbonate, ethylene carbonate, butylene carbonate, dimethyl carbonate, methyl carbonate, diethyl carbonate, sulfolane, methyl sulfolane, γ-butyrolactone, γ-valerolactone, N-methyloxazolidinone, dimethylsulfoxide, trimethylsulfoxide, and the like can be used. An organic solvent including lithium ions is particularly suitable for the electrolyte solution because lithium (Li) has the lowest standard electrode potential.

As the separator, for example, cellulose (paper), polyethylene nonwoven, polypropylene nonwoven, polyester nonwoven, a glass fiber sheet, porous polyethylene, porous polypropylene, porous polyester, or the like can be used.

According to this embodiment, a thin energy storage device having high capacity can be obtained. According to this embodiment, an energy storage device having high output can be obtained. According to this embodiment, a current collector and an active material layer can be formed in the same manufacturing step. According to this embodiment, the number of manufacturing steps of an energy storage device can be reduced by forming a current collector and an active material layer in the same manufacturing step. According to this embodiment, the manufacturing cost of an energy storage device can be suppressed by reducing the number of manufacturing steps of the energy storage device.

<Lithium Ion Capacitor>

Figure 2A:
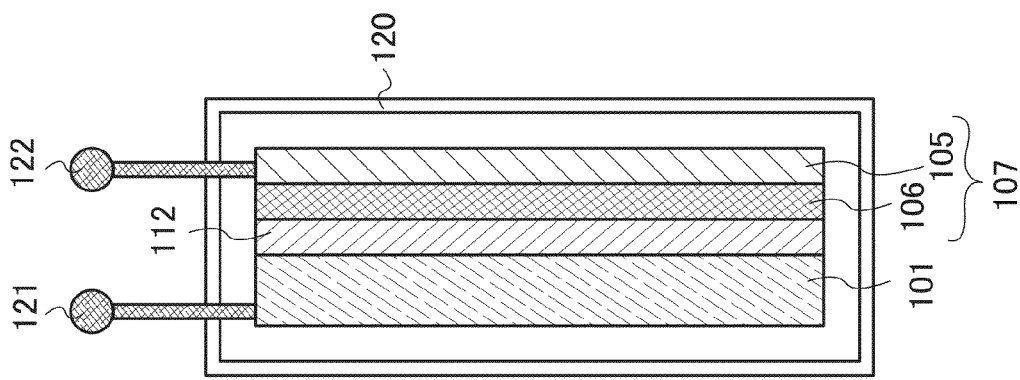
FIGS. 2A to 2C are cross-sectional views of energy storage devices.

FIG. 2A is a cross-sectional view of a lithium ion capacitor of this embodiment. The lithium ion capacitor illustrated in FIG. 2A includes, inside the housing 120, a positive electrode 101, a negative electrode 107, the separator 110 provided between the positive electrode 101 and the negative electrode 107, and an electrolyte 112 with which the housing 120 is filled. The negative electrode 107 includes a negative electrode current collector 105 and a negative electrode active material layer 106. Further, the lithium ion capacitor illustrated in FIG. 2A includes the terminal portion 121 connected to the positive electrode 101 and the terminal portion 122 connected to the negative electrode 107.

Figure 2B:
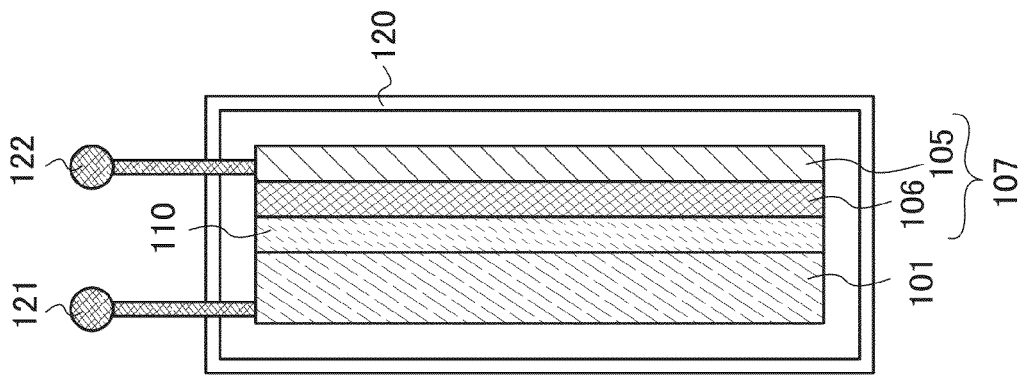

FIG. 2B illustrates a cross section of a lithium ion capacitor having a structure different from that in FIG. 2A. The lithium ion capacitor illustrated in FIG. 2B includes, inside the housing 120, the positive electrode 101, the negative electrode 107, the separator 110 provided between the positive electrode 101 and the negative electrode 107, and the electrolyte 112 included in the separator 110.

The positive electrodes 101 of the lithium ion capacitors illustrated in FIGS. 2A and 2B are each a porous metal body formed using a porous metal material, such as a porous metal foil or a porous metal plate, as in the case of the electrodes 102 and 103 of the electric double layer capacitors illustrated in FIGS. 1A and 1B. The porous metal body functions as a positive electrode current collector and a positive electrode active material layer of the lithium ion capacitor.

When the positive electrode 101 is formed using a porous metal material, a thin energy storage device having high capacity can be obtained. In addition, an energy storage device having high output can be obtained. Further, the number of manufacturing steps of an energy storage device can be reduced by forming a current collector and an active material layer in the same manufacturing step. The manufacturing cost of an energy storage device can be suppressed by reducing the number of manufacturing steps of the energy storage device.

For the negative electrode current collector 105, a conductive material having a foil shape, a plate shape, or a net shape can be used. The negative electrode current collector 105 can be formed using a metal element having high conductivity such as platinum, aluminum, copper, or titanium, for example. The negative electrode current collector 105 can be formed using an aluminum alloy to which an element that improves heat resistance, such as silicon, titanium, neodymium, scandium, or molybdenum, is added. Alternatively, the negative electrode current collector 105 can be formed using a metal element that forms a silicide, such as zirconium, titanium, hafnium, vanadium, niobium, tantalum, chromium, molybdenum, tungsten, cobalt, or nickel. A semiconductor substrate such as a silicon wafer may be used as the negative electrode current collector 105.

The negative electrode active material layer 106 is formed using a material capable of lithium-ion insertion and extraction. As the material capable of lithium-ion insertion and extraction, a carbon material, a silicon material, a silicon alloy material, and the like can be given.

As the carbon material, powdered or fibrous graphite or the like can be used.

As the silicon material, a material obtained by depositing microcrystalline silicon and then removing amorphous silicon from the microcrystalline silicon by etching may be used. When amorphous silicon is removed from microcrystalline silicon, the surface area of the remaining microcrystalline silicon is increased.

The silicon material preferably includes a whisker. In this specification and the like, a whisker is protruded (whisker-like) crystalline silicon. However, there is no particular limitation on the shape of the whisker as long as the whisker is a crystalline protrusion. For example, the shape of the whisker may be a columnar shape such as a cylinder shape or a prism shape, or a needle shape such as a cone shape or a pyramid shape. In addition, the top of the whisker may be rounded. In the case where a plurality of whiskers is formed, the directions of extension (i.e., the directions of axes) of protrusions may vary. Alternatively, the directions of extension (i.e., the directions of axes) of protrusions in the plurality of whiskers may be the normal direction to the current collector. The "whisker" in this specification and the like may include a whisker group (a plurality of whiskers). When the negative electrode active material layer 106 includes a whisker group, the surface area of the negative electrode active material layer 106 is increased and the discharge capacity of the lithium ion capacitor can be increased.

The negative electrode active material layer 106 is formed by impregnating the material capable of lithium-ion insertion and extraction with metal lithium.

Note that in the case where alkali metal ions other than lithium ions or alkaline earth metal ions are used as carrier ions, the negative electrode active material layer 106 is formed using a carbon material, a silicon material, a silicon alloy material, or the like which is impregnated with a raw material of the carrier ions. In this manner, an electrochemical capacitor in which carrier ions are alkali metal ions other than lithium ions or alkaline earth metal ions can be obtained.

In the case where a liquid electrolyte, that is, an electrolyte solution is used as the electrolyte 112, a material including a lithium salt, for example, $LiClO_4$, $LiAsF_6$, $LiBF_4$, $LiPF_6$, or $Li(C_2F_5SO_2)_2N$ is used as a solute of the electrolyte solution. In addition, in the case where carrier ions are alkali metal ions other than lithium ions or alkaline earth metal ions, it is possible to use any of the following as the solute of the electrolyte solution: alkali metal salts such as sodium salts and potassium salts; beryllium salts; magnesium salts; and alkaline earth metal salts such as calcium salts, strontium salts, and barium salts.

As a solvent of the electrolyte solution, a material in which transport of carrier ions is possible can be used, and an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, and tetrahydrofuran. As the solvent of the electrolyte solution, one or more materials can be used. By using a gelled polymer as the solvent of the electrolyte solution, safety against liquid leakage is increased, and the electrochemical capacitor of this embodiment can be made thinner and more lightweight. Examples of the gelled polymer include a silicon gel, an acrylic gel, an acrylonitrile gel, polyethylene oxide, polypropylene oxide, and a fluorine-based polymer.

Figure 2C:
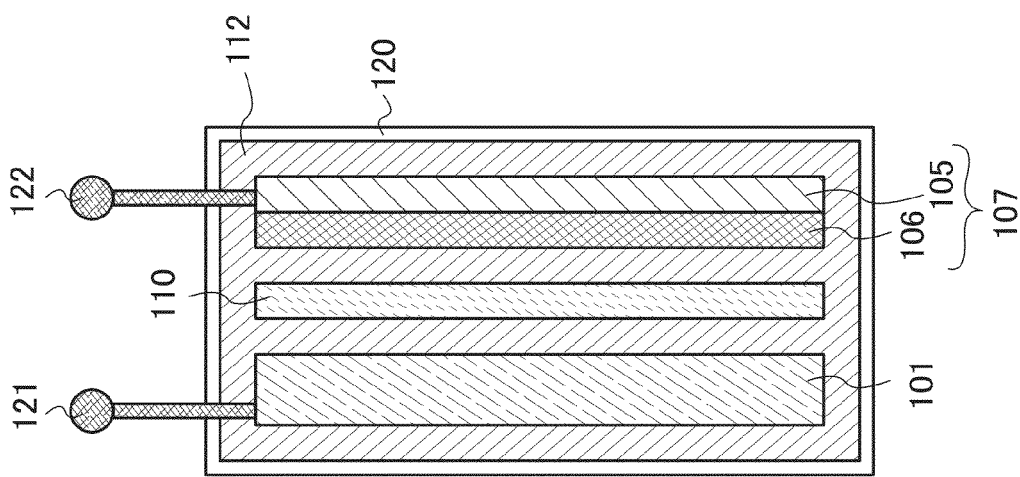

FIG. 2C illustrates an electrochemical capacitor including a solid electrolyte layer as the electrolyte 112. In the case where a solid electrolyte layer is used as the electrolyte 112, the electrolyte 112 (the solid electrolyte layer) is provided between the positive electrode 101 and the negative electrode 107 without providing the separator 110.

For the solid electrolyte layer, any of the following can be used: oxides or phosphates of lithium such as lithium phosphate ($Li_xPO_y$), lithium iron phosphate ($Li_xFe_y(PO_4)_z$), lithium manganese phosphate ($Li_xMn_y(PO_4)_z$), lithium nickel phosphate ($Li_xNi_y(PO_4)_z$), and lithium chromium phosphate ($Li_xCr_y(PO_4)_z$); a phosphorus sulfide compound such as lithium phosphorus sulfide ($Li_xPS_y$); and the like (x, y, and z are positive real numbers). Further, the solid electrolyte layer may have a single-layer structure or a stacked structure. In this embodiment, the solid electrolyte layer is formed to have a single-layer structure using lithium phosphate.

The solid electrolyte layer can be formed by a sputtering method, for example. In the case where lithium phosphate is deposited to form the solid electrolyte layer by a sputtering method, a sputtering target including at least Li and $PO_4$ may be sputtered with an ion of a rare gas or the like. An example of the composition of the sputtering target is $Li_xFe_y(PO_4)_z$ as a general formula and specifically $Li_3Fe_2(PO_4)_3$. A material forming the target may be a mixed material, an example of which is a mixture of $Li_3Fe_2(PO_4)_3$ and $Fe_2O_3$. Lithium iron phosphate having a NASICON structure is preferably used for the target. Thus, the solid electrolyte layer can be formed using an inexpensive and stable target.

According to this embodiment, a thin energy storage device having high capacity can be obtained. According to this embodiment, an energy storage device having high output can be obtained. According to this embodiment, a current collector and an active material layer can be formed in the same manufacturing step. According to this embodiment, the number of manufacturing steps of an energy storage device can be reduced by forming a current collector and an active material layer in the same manufacturing step. According to this embodiment, the manufacturing cost of an energy storage device can be suppressed by reducing the number of manufacturing steps of the energy storage device.

Embodiment 2

In this embodiment, an application example of the energy storage device described in Embodiment 1 will be described with reference to FIG. 4.

The energy storage device described in Embodiment 1 can be used in electronic devices such as cameras such as digital cameras or video cameras, digital photo frames, mobile phones (also referred to as cellular phones or cellular phone devices), portable game machines, portable information terminals, and audio reproducing devices. Further, the energy storage device can be used in electric propulsion vehicles such as electric vehicles, hybrid vehicles, train vehicles, maintenance vehicles, carts, and wheelchairs. Here, as a typical example of the electric propulsion vehicle, a wheelchair is described (see FIG. 4).

Figure 4:
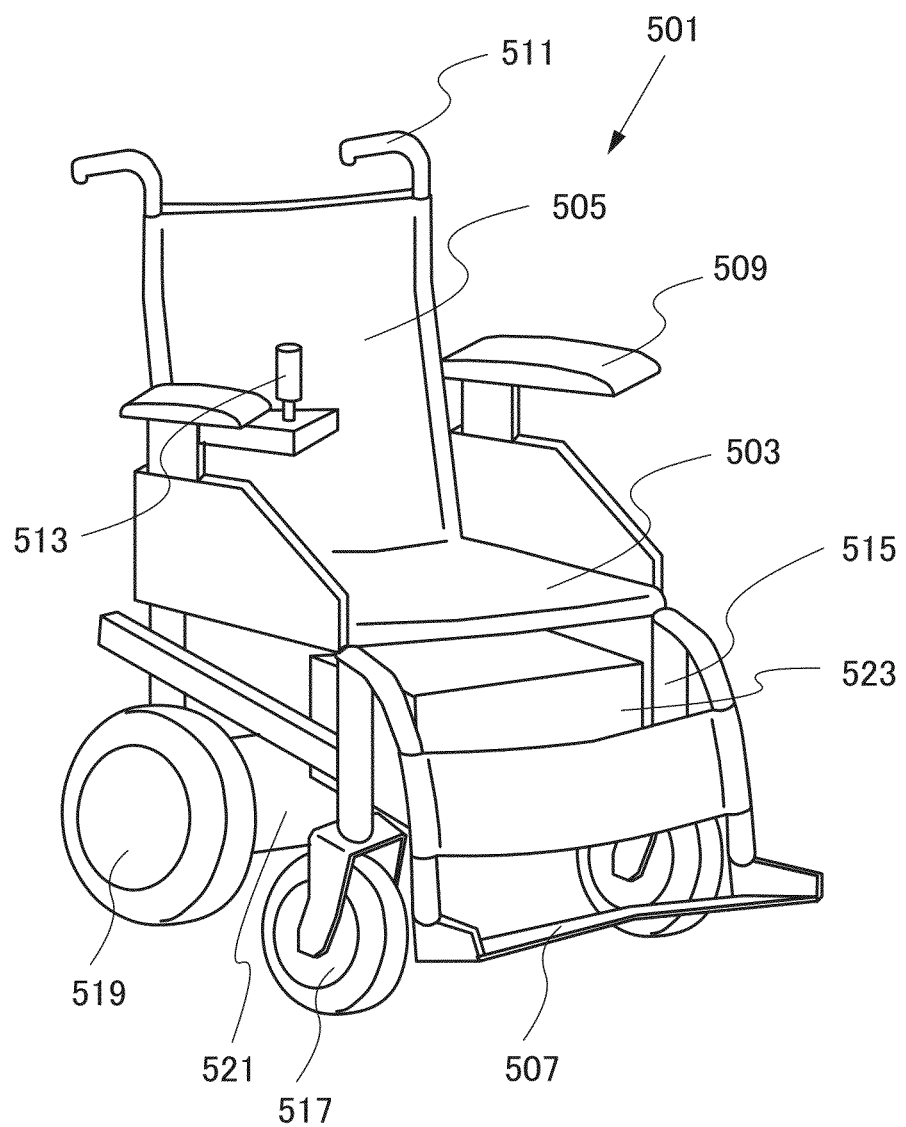
FIG. 4 is a perspective view illustrating an application example of an energy storage device.

FIG. 4 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair 501 is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 including a motor, a brake, a gear, and the like. A control portion 523 including a battery, a power controller, a control means, and the like is provided under the seat 503. The control portion 523 is connected to the controller 513 and the driving portion 521. The driving portion 521 is driven through the control portion 523 with the operation of the controller 513 by the user and the operation of moving forward, moving backward, turning around, and the like, and the speed of the electric wheelchair 501 is controlled.

In this embodiment, the energy storage device described in Embodiment 1 can be used as a power source of the control portion 523. The power source of the control portion 523 can be charged by external electric power supply using a plug-in system or contactless power feeding. In the case where the electric propulsion vehicle is a train vehicle, the train vehicle can be charged by electric power supply from an overhead cable or a conductor rail.

Note that this embodiment can be combined with any of the structures, methods, and the like described in the other embodiment as appropriate.

This application is based on Japanese Patent Application serial no. 2010-149499 filed with the Japan Patent Office on Jun. 30, 2010, the entire contents of which are hereby incorporated by reference.

What is claimed is:

1. A method for manufacturing a double layer capacitor device comprising the steps of:
preparing a pair of metal materials each comprising a first metal and a second metal;
removing the first metal from at least one of the pair of metal materials in an etching material to form a porous structure;
providing an electrolyte between the pair of metal materials;
wherein a surface area per volume of the porous structure is greater than or equal to 100 $m^2/cm^3$.

2. The method for manufacturing the double layer capacitor according to claim 1,
wherein each of the pair of metal materials is a metal foil or a metal plate.

3. A method for manufacturing a double layer capacitor device comprising the steps of:
preparing a pair of metal materials each comprising a first metal and at least one of copper (Cu), silver (Ag), platinum (Pt), gold (Au), chromium (Cr), iron (Fe), lead (Pb), nickel (Ni), and molybdenum (Mo);
removing the first metal from at least one of the pair of metal materials in an etching material to form a porous structure;
providing an electrolyte between the pair of metal materials;
wherein a surface area per volume of the porous structure is greater than or equal to 100 $m^2/cm^3$.

4. The method for manufacturing the double layer capacitor according to claim 3,
wherein each of the pair of metal materials is a metal foil or a metal.

5. A method for manufacturing a lithium ion capacitor comprising the steps of:
preparing a pair of metal materials each comprising a first metal and a second metal;
removing the second metal from at least one of the pair of metal materials in an etching material to form a porous structure;
forming a positive active material layer over one of the pair of metal materials;
forming a negative active material layer over the other of the pair of metal materials;
providing an electrolyte between the pair of metal materials;
wherein a surface area per volume of the porous structure is greater than or equal to 100 $m^2/cm^3$.

6. The method for manufacturing the lithium ion capacitor according to claim 5,
wherein each of the pair of metal materials is a metal foil or a metal plate.

7. A method for manufacturing a lithium ion capacitor comprising the steps of:
preparing a pair of metal materials each comprising a first metal and at least one of copper (Cu), silver (Ag), platinum (Pt), gold (Au), chromium (Cr), iron (Fe), lead (Pb), nickel (Ni), and molybdenum (Mo);
removing the first metal from at least one of the pair of metal materials in an etching material to form a porous structure;
forming a positive active material layer over one of the pair of metal materials;
forming a negative active material layer over the other of the pair of metal materials
providing an electrolyte between the pair of metal materials;
wherein a surface area per volume of the porous structure is greater than or equal to 100 $m^2/cm^3$.

8. The method for manufacturing the lithium ion capacitor according to claim 7,
wherein each of the pair of metal materials is a metal foil or a metal plate.

* * * * *